(12) United States Patent
Buckley

(10) Patent No.: US 11,087,442 B1
(45) Date of Patent: Aug. 10, 2021

(54) MASK-BASED SPATIO-TEMPORAL DITHERING

(71) Applicant: Facebook Technologies, LLC, Menlo Park, CA (US)

(72) Inventor: Edward Buckley, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/689,641

(22) Filed: Nov. 20, 2019

(51) Int. Cl.
*G06T 5/00* (2006.01)
*G09G 3/20* (2006.01)

(52) U.S. Cl.
CPC .................................. *G06T 5/005* (2013.01)

(58) Field of Classification Search
CPC ..... G06T 5/005; G09G 3/2022; G09G 3/2044
See application file for complete search history.

(56) References Cited

U.S. PATENT DOCUMENTS

| | | | | |
|---|---|---|---|---|
| 2004/0220804 A1* | 11/2004 | Odell | .................... | G10L 15/142 704/230 |
| 2006/0146191 A1* | 7/2006 | Kim | ....................... | H04N 19/46 348/557 |
| 2011/0116723 A1* | 5/2011 | Rasmusson | ............. | G06T 9/004 382/238 |
| 2011/0141496 A1* | 6/2011 | Keselbrener | ......... | H04N 1/4078 358/1.9 |
| 2013/0279826 A1* | 10/2013 | Chuang | ................. | G06T 3/4069 382/299 |
| 2016/0118020 A1* | 4/2016 | Buckley | ................... | G09G 5/02 345/597 |
| 2017/0278447 A1* | 9/2017 | Yaras | ........................ | G09G 5/10 |
| 2017/0371507 A1* | 12/2017 | Cengil | .................. | G06F 3/0482 |
| 2019/0025589 A1* | 1/2019 | Haddick | ............ | G02B 27/0018 |

* cited by examiner

*Primary Examiner* — Yi Yang
(74) *Attorney, Agent, or Firm* — Baker Botts L.L.P.

(57) ABSTRACT

In one embodiment, a computing system may determine, for a pixel of a current subframe of a series of subframes, a compensated target pixel value based on a difference between (1) an aggregated target pixel value of the pixel in the current subframe and previous subframes of the series of subframes and (2) an aggregated actual pixel value of displayed pixel values of the pixel in the previous subframes of the series of subframes. The compensated target pixel value may compensate a quantization error for the pixel displayed in the previously subframes of the series of subframes. The system may access a mask value, corresponding to a pixel position of the pixel, from a dithering mask having a spatial stacking property. The system may determine a quantized pixel value for the pixel of the current subframe by quantizing the compensated target pixel value based on the mask value.

20 Claims, 13 Drawing Sheets

400A

400B

400C

400D

MASK-BASED SPATIO-TEMPORAL DITHERING

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to a method of generating a series of subframes having less grayscale levels to represent a target image with more grayscale levels by propagating quantization errors temporally to subsequent subframes through an error buffer. The pixel values of the n-th subframe of a series of N subframes may be determined by taking into consideration what has been displayed in previously subframes of the series of N subframes. The pixel values of the n-th subframe may compensate the difference between (1) the aggregated target pixel value of subframes 1 to n and (2) the aggregation of the displayed pixel values of all previous subframes 1 to n−1. For example, for determining a pixel value at a pixel position (x, y) in the n-th subframe of a series of N subframes, the system may determine the difference between the aggregated target pixel value $$\frac{n}{N} \cdot I_{xy}$$

of subframe 1 to n and the aggregation of the displayed pixel values of previous subframes $F_{xy}^{n-1}$ of subframe 1 to n−1. The system may determine a compensated pixel value $p_{xy}^n$ based on the difference between $$\frac{n}{N} \cdot I_{xy}$$

and $F_{xy}^{n-1}$. For computation efficiency purpose, in particular embodiments, the system may determine an intermediate compensated pixel value $p''_{xy}{}^n$ by multiplying the difference value (i.e., $$\frac{n}{N} \cdot I_{xy} - F_{xy}^{n-1})$$

by N and clipping the result value to [0, 1]. The actual pixel value $p'_{xy}{}^n$ to be dithered and displayed for this pixel (x, y) of the n-th subframe may be determined by based on the compensated target pixel value $p_{xy}{}^n$ or the intermediate compensated target pixel value $p''_{xy}{}^n$. The aggregated pixel value $F_{xy}^{n-1}$ of previous subframes may correspond to the sum of all displayed/dithered pixel values for the pixel (x, y) in subframes 1 to n−1. The system may use an error buffer to propagate the quantization errors when generating each subframe of the series of N subframes and the quantization error propagation process may be applied to each subframe. The system may display the series of subframes within a pre-determined time duration allowing the human visual system to work as temporal integrators. A temporal integration of the series of N subframes may effectively approximate the target image because of temporal aggregation effect (or temporal integration effect) of the human visual system. As a result, the system may display the series of N subframes (having less grayscale levels) sequentially in time domain (e.g., within a predetermined time duration) to provide an effective illusion of the target image (which has more grayscale levels).

In particular embodiments, the system may quantize the compensated target pixel values using a linear or non-linear quantization process. The quantization of the compensated pixel value $p_{xy}{}^n$ for the pixel (x, y) may be based on a mask value $t_{xy}$ associated with the pixel (x, y) and accessed from a dithering mask which has a spatial stacking property. For linear quantization, the quantization levels may be linearly distributed within the quantization range. The system may access a mask value $t_{xy}$ associated with the pixel position (x, y) from the dither mask. The system may divide the compensated target pixel value $p_{xy}{}^n$ by the quantization level unit (e.g., $$\frac{1}{2^k - 1}$$

for k bits) of the quantization range corresponding to the least significant bit and add the mask value $t_{xy}$ to the result of division. Then, the system may use floor operation to determine the closest grayscale level less than $$\frac{p_{xy}^n}{LSB} + t_{xy}$$

and multiply the result by the quantization level unit to normalize the value to [0, 1]. For non-linear quantization, quantization levels may be non-linearly distributed in the quantization range. The system may first determine the closest quantization level $g_j$ less than $p_{xy}{}^n$ and the closest quantization level $g_{j+1}$ greater than $p_{xy}{}^n$. Then, the system may determine a remainder r of $p_{xy}{}^n$ over $g_j$. The system may compare the remainder r to the mask value $t_{xy}$ corresponding this pixel. When the remainder r is greater than the mask value $t_{xy}$, the system may determine the quantized value as $g_{j+1}$. When the remainder is less than the mask value $t_{xy}$, the system may determine the quantized value as $g_j$. By using the mask value accessed from the dithering mask for quantizing the dithering values, the system may generate a series of N subframes preserving the spatial stacking property as determined by the dithering mask.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

The number of available bits in a display may limit the display's color depth or gray scale levels. To achieve display results with higher effective grayscale level, displays may use a series of temporal subframes with less grayscale level bits to create the illusion of a target image with more grayscale level bits. The series of subframes may be generated using a segmented quantization process with each segment having a different weight. The quantization errors may be dithered spatially within each subframe. However, the subframes generated in this way may have a naïve stacking property (e.g., direct stacking property without using a dithering mask) and each subframe may be generated without considering what has been displayed in former subframes causing the subframes to have some artifacts that could negatively impact the experience of the viewers.

In particular embodiments, the system may use a mask-based spatio-temporal dithering method for generating each subframe of a series of subframes taking into consideration what has been displayed in the previous subframes preceding that subframe. The system may determine target pixel values of current subframe by compensating the quantization errors of the previously subframes. The pixel values of the current subframe may be determined by quantizing the target pixel values based on a dithering mask having a spatial stacking property. The quantization errors may be propagated into subsequent subframes through an error buffer. The generated subframes may satisfy both spatial and temporal stacking property and provide better image display results and better user experience.

Particular embodiments of the system may provide better image quality and improve user experience for AR/VR display by using multiple subframe images with less color depth to represent an image with greater color depth. Particular embodiments of the system may generate subframe images with reduced or eliminated temporal artifacts. Particular embodiments of the system may allow AR/VR display system to reduce the space and complexity of pixel circuits by having less gray level bits, and therefore miniaturize the size of the display system. Particular embodiments of the system may make it possible for AR/VR displays to operate in monochrome mode with digital pixel circuits without using analog pixel circuits for full RGB operations.

Figure 1A:
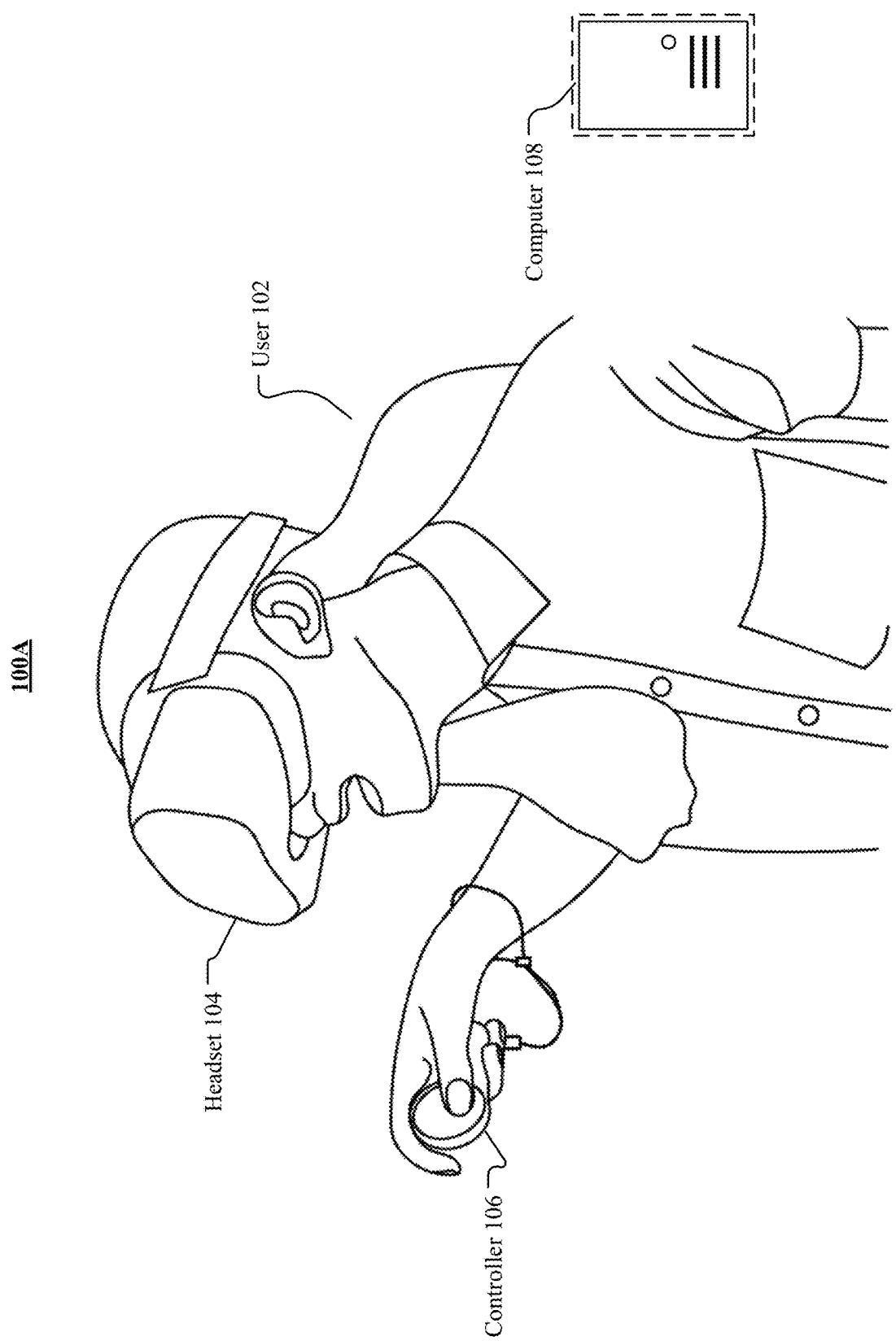
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
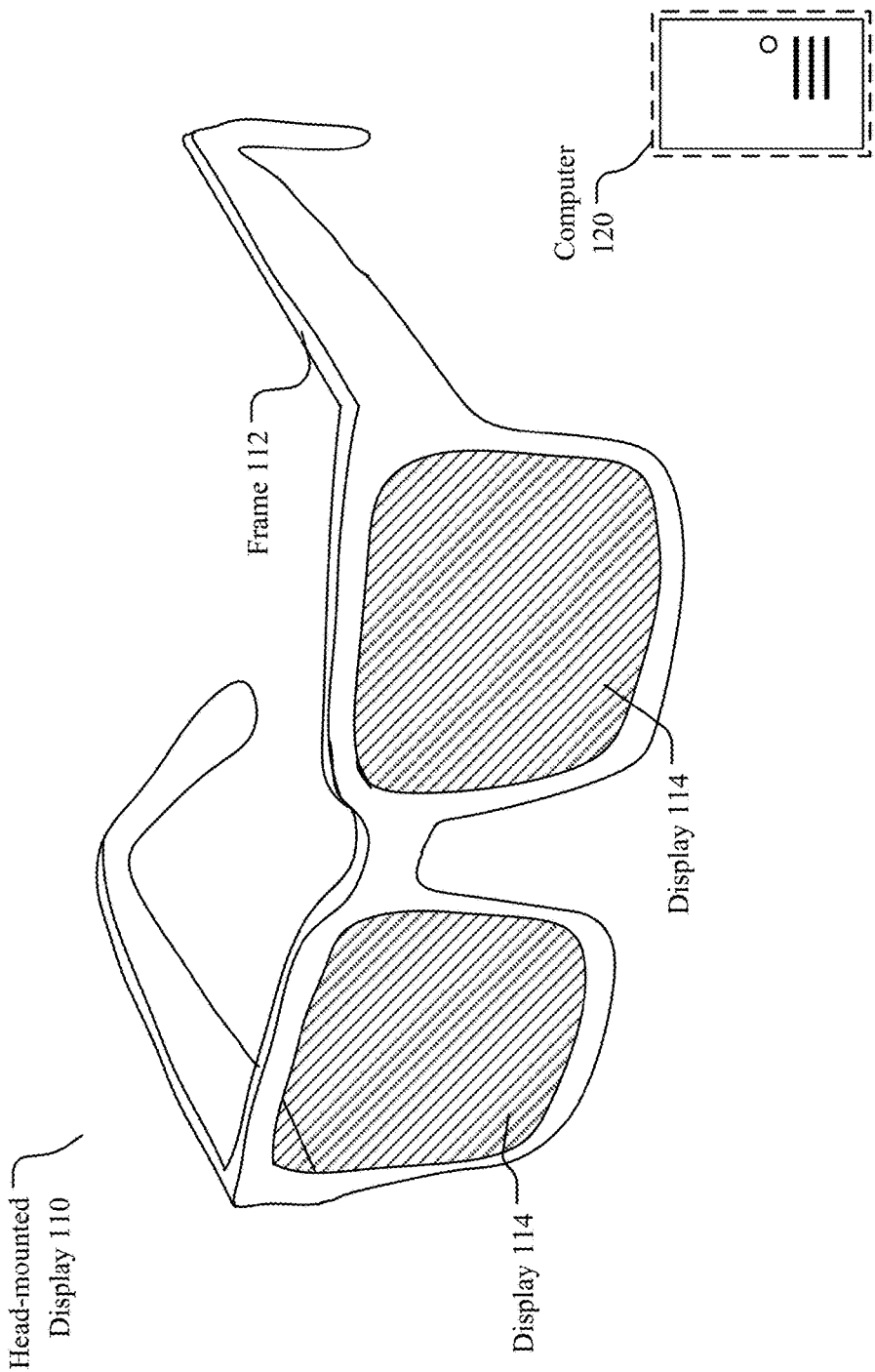
FIG. 1B illustrates an example augmented reality system.

FIG. 1B illustrates an example augmented reality system 100B. The augmented reality system 100 may include a head-mounted display (HMD) 110 (e.g., glasses) comprising a frame 112, one or more displays 114, and a computing system 120. The displays 114 may be transparent or translucent allowing a user wearing the MD 110 to look through the displays 114 to see the real world and displaying visual artificial reality content to the user at the same time. The MD 110 may include an audio device that may provide audio artificial reality content to users. The MD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the MD 110 and the controller through cables or wireless connections. The computing system 120 may control the MD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
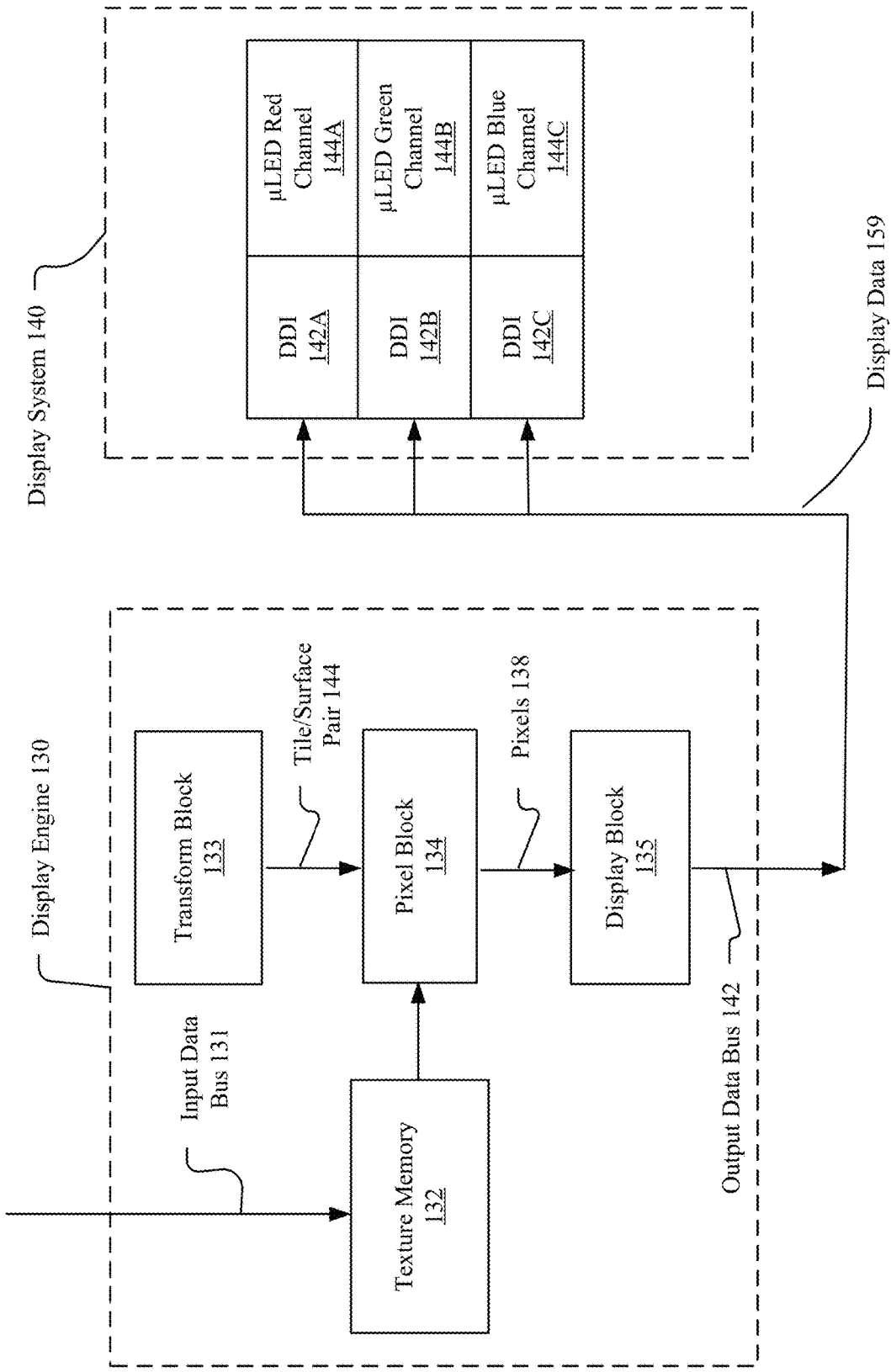
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (pLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), etc.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
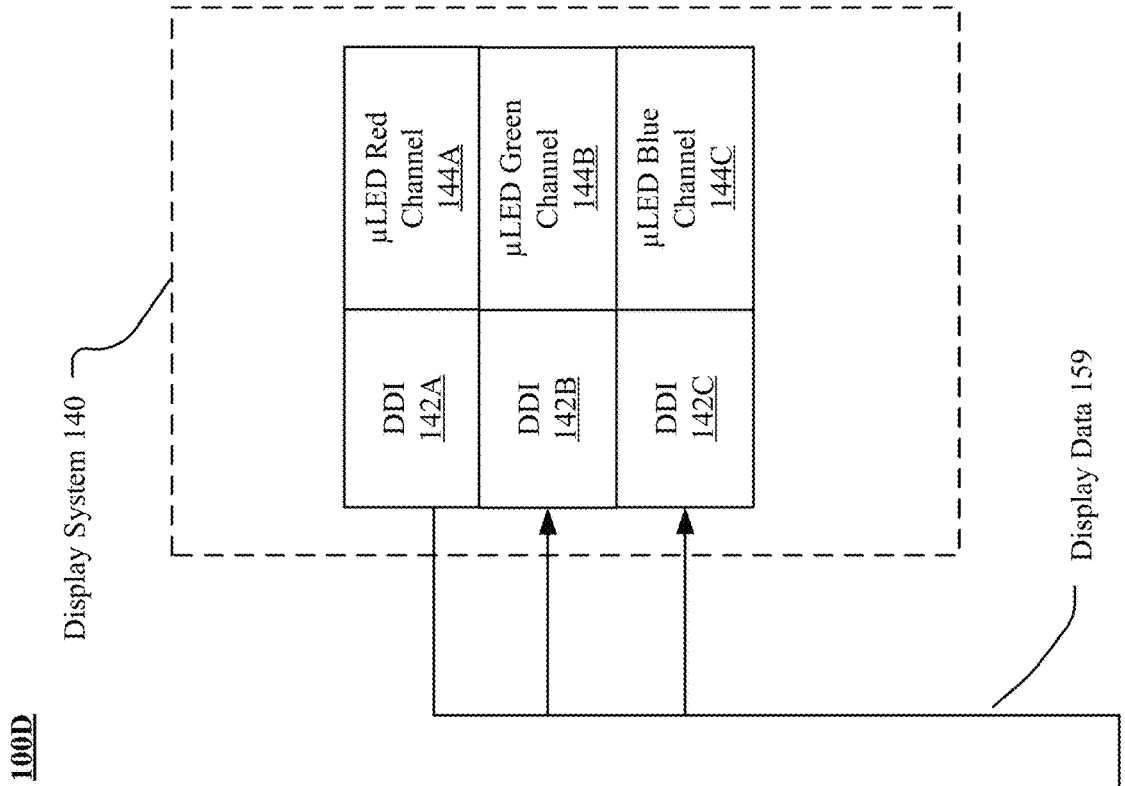
FIG. 1D illustrates an example graphic pipeline of the display engine for generating display image data.
Figure 1D:
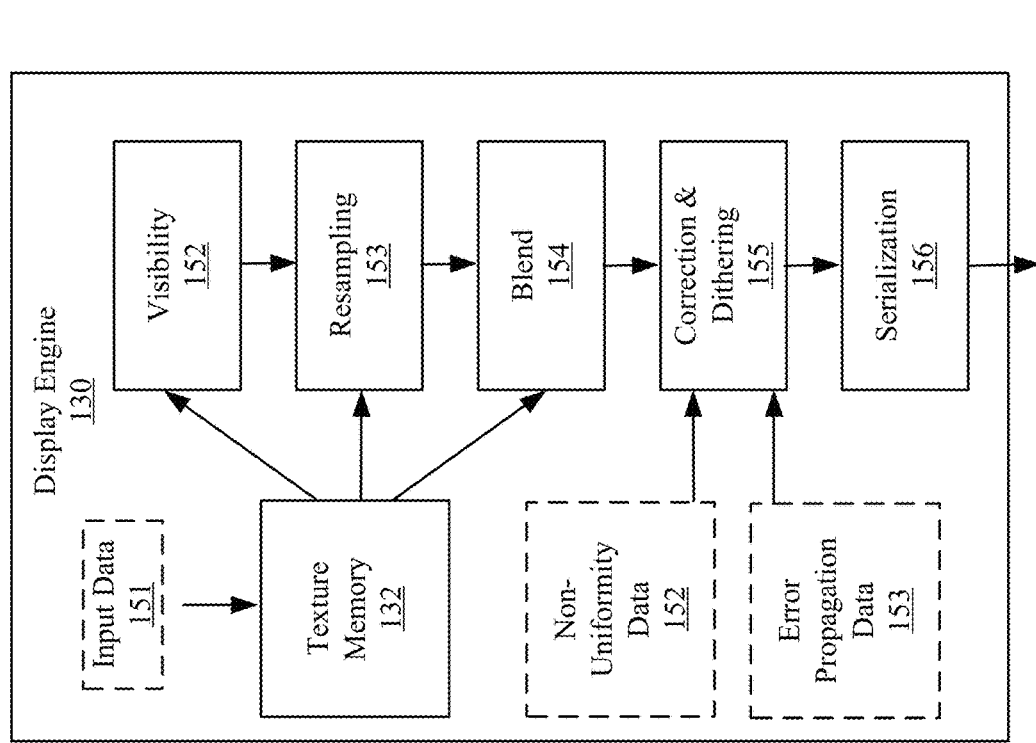

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
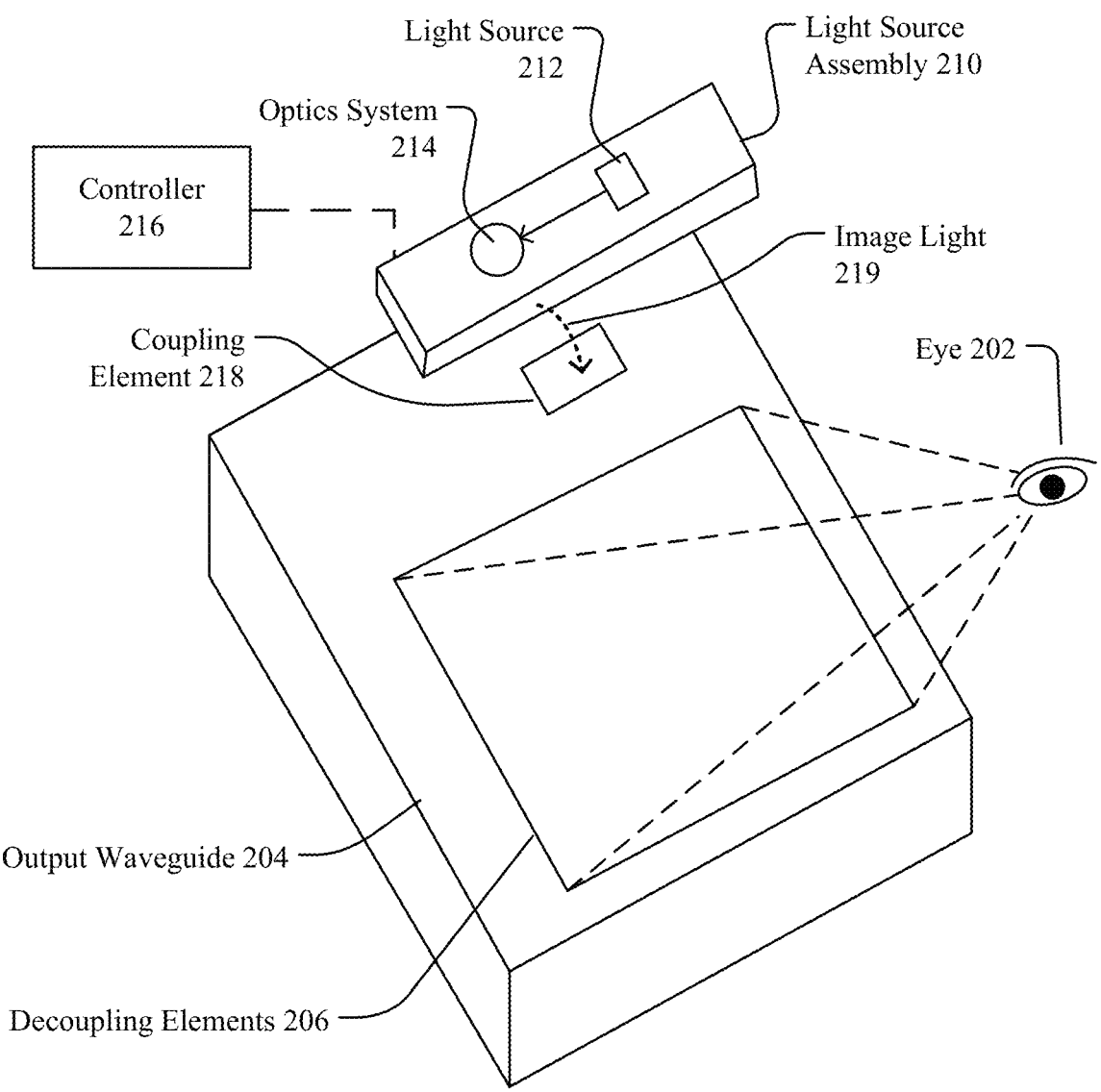
FIG. 2A illustrates an example scanning waveguide display.
Figure 3A:
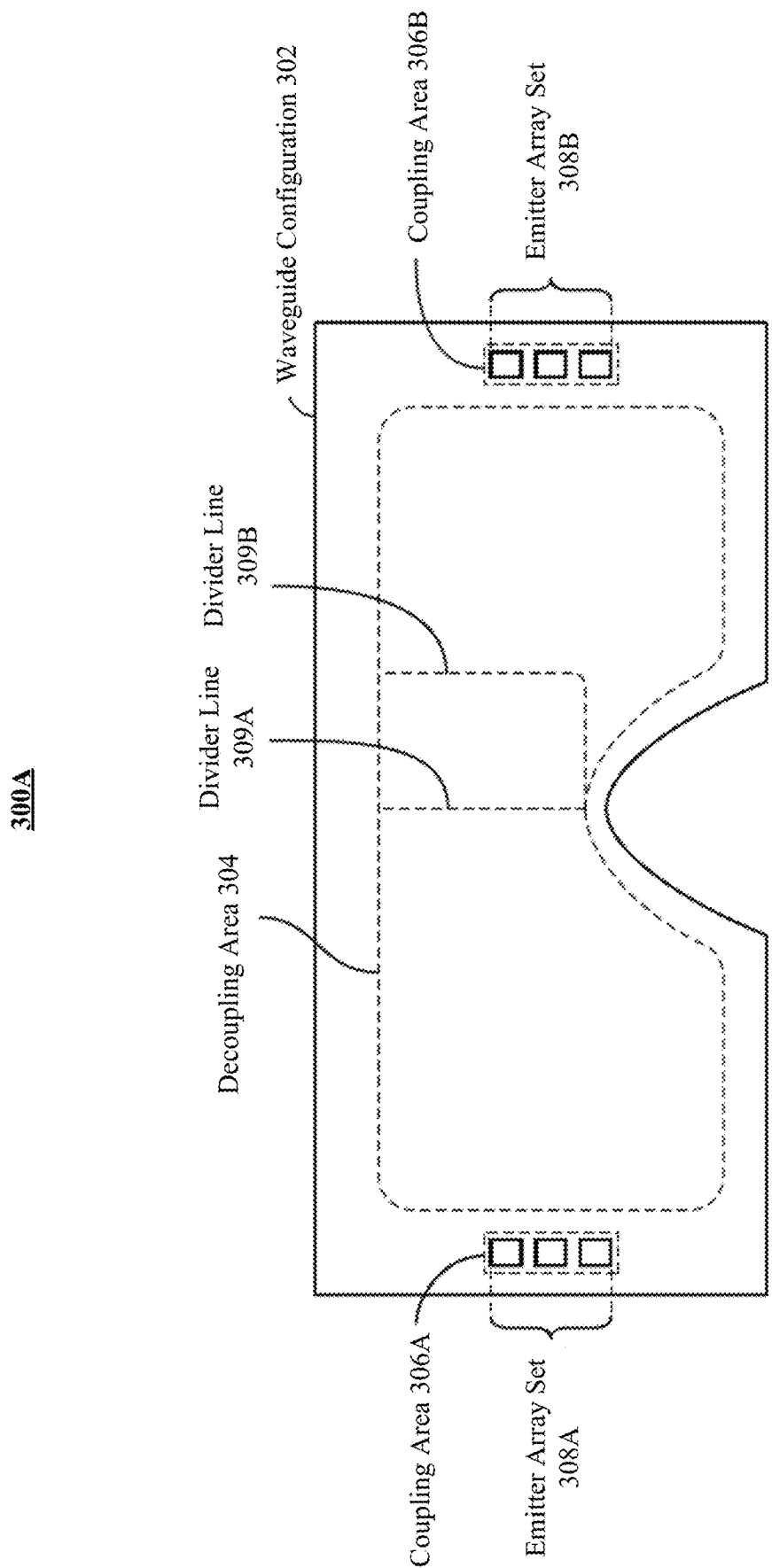
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
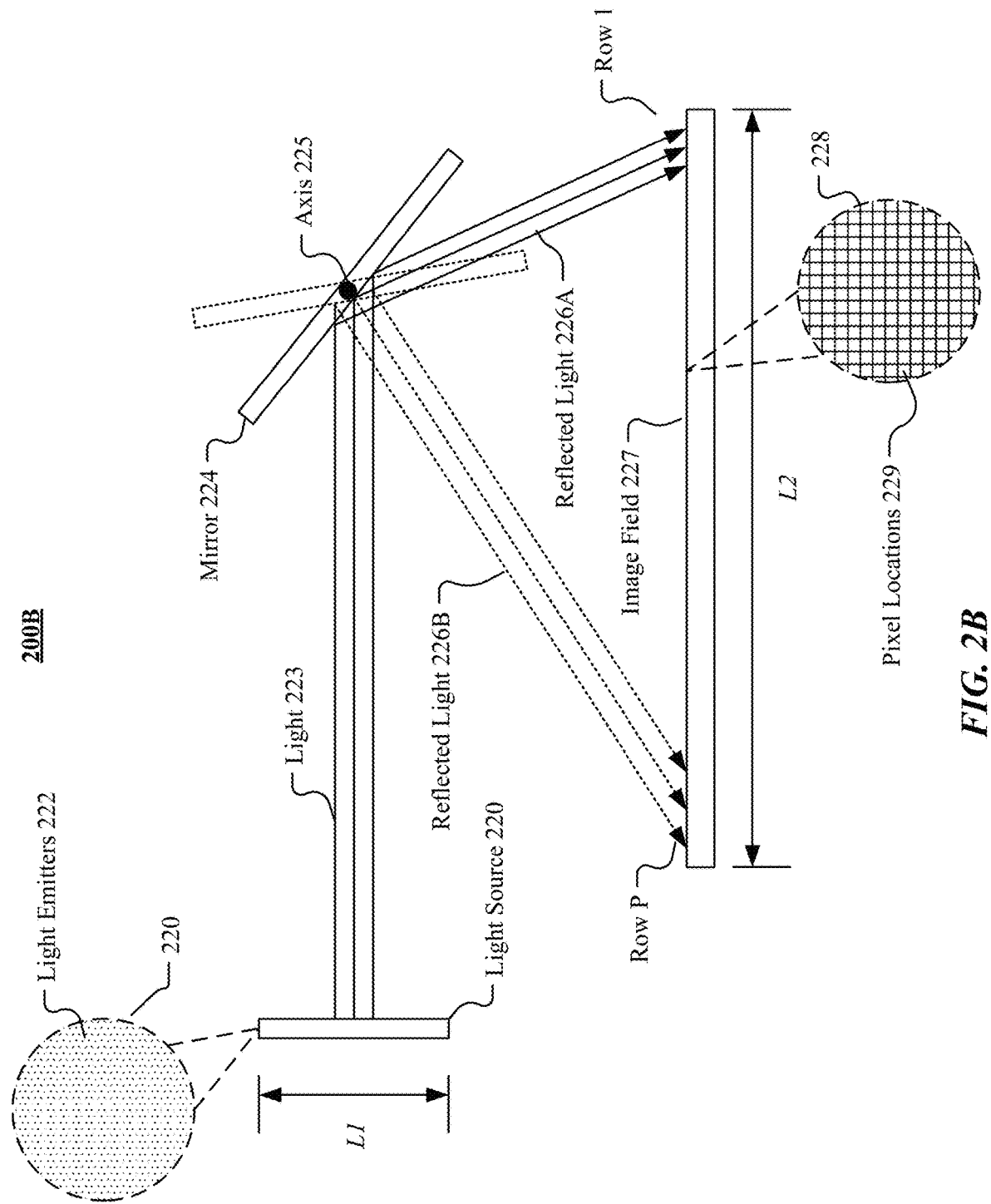
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A.

Figure 3B:
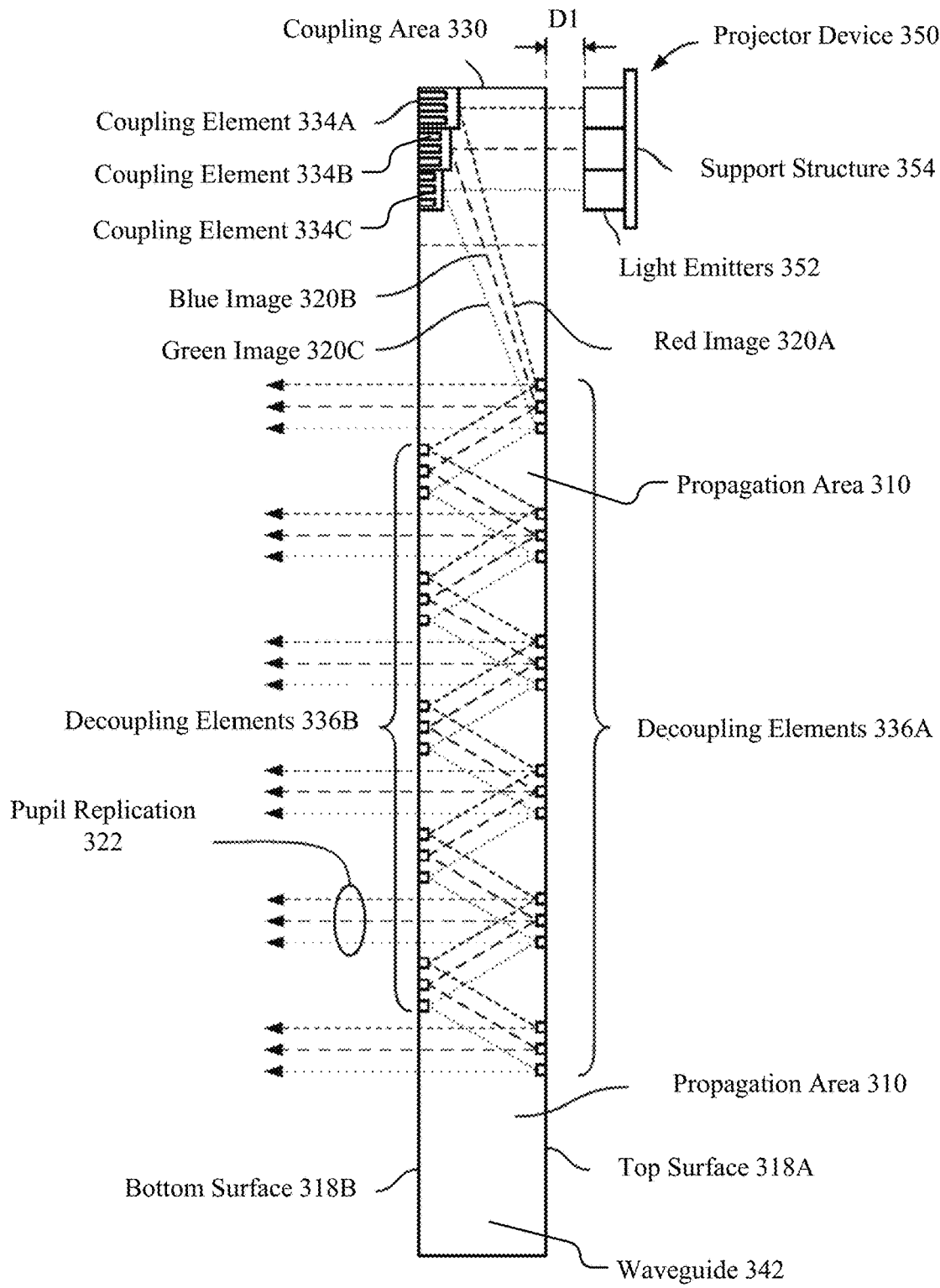
FIG. 3B illustrates an example waveguide configuration for the 2D micro-LED waveguide display.

In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 1800 apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of DI (e.g., approximately 50 µm to approximately 500 µm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

To improve the displayed image quality, displays with limited color depth or gray scale level may use spatio dithering to spread quantization errors to neighboring pixels and generate the illusion of increased color depth or gray scale level. To further increase the color depth or gray scale level, displays may generate a series of temporal subframe images with less gray level bits to give the illusion of a target image which has more gray level bits. Each subframe image may be dithered using spatio dithering techniques within that subframe image. The temporal average or aggregation of the series of subframe image may correspond to the image as perceived by the viewer. For example, for display an image with 8-bit pixels (i.e., 256 gray levels), the system may use four subframe images each having 6-bit pixels (i.e., 64 gray level) to represent the 8-bit target image. As another example, an image with 8-bit pixels (i.e., 256 gray levels) may be represented by 16 subframe images each having 4-bit pixels (i.e., 16 gray levels). This would allow the display system to render images of more gray level (e.g., 8-bit pixels) with pixel circuits and supporting hardware for less gray levels (e.g., 6-bit pixels or 4-bit pixels), and therefore reduce the space and size of the display system.

Figure 4A:
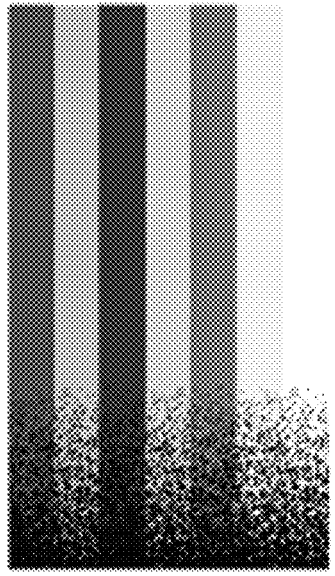
FIG. 4A illustrates an example target image to be represented by a series of subframe images with less color depth.
Figure 4B:
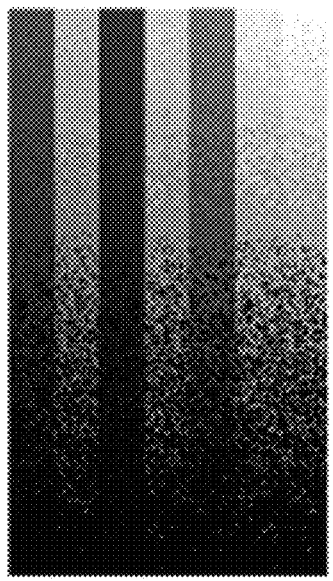
FIGS. 4B-D illustrate example subframe images generated using segmented quantization and spatio dithering method to represent the target image of FIG. 4A.
Figure 4C:
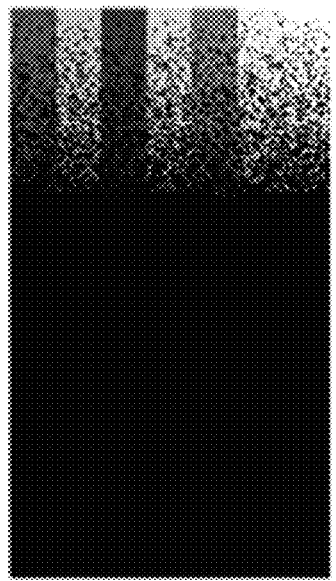
Figure 4D:
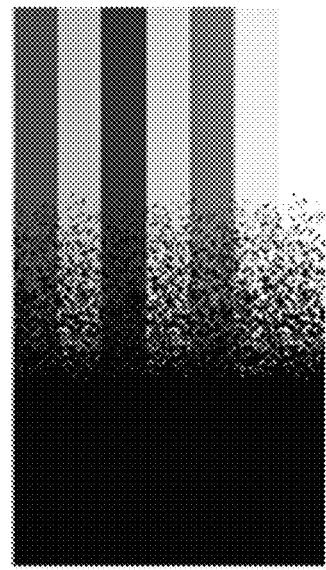

FIG. 4A illustrates an example target image 400A to be represented by a series of subframe images with less color depth. FIGS. 4B-D illustrate example subframe images 400B-D generated using segmented quantization and spatio dithering method to represent the target image 400A of FIG. 4A. The target image 400A may have more gray level bits than the physical display. The subframe images 400B-D may have gray level bits corresponding to the physical display, which is less than the target image 400A, and may be used to represent the target image using the temporal average or temporal aggregation as perceived by viewers. To generate each subframe image, the value of each pixel in the target image may be quantized according to a series of segmented value ranges corresponding to the weighted value ranges of the subframe images. Each subframe image may correspond to a segmented portion of the pixel range of the target image. The pixel value range of each subframe image may be weighted according to the corresponding segmented portion of the target image pixel range. As an example and not by way of limitation, the first, second and third subframes (as shown in FIGS. 4B-D, respectively) may cover the grayscale level ranges of [0, ⅓], [⅓, ⅔] and [⅔, 1] in the normalized grayscale level range of [0, 1].

However, using this segmented quantization and spatio dithering method, even though the average luminance of the all subframe images over time is approximately equal to the target image, the subframes 400B-D may have very different luminance, as illustrated in FIGS. 4B-D. For example, the subframe image 400B capturing the lower energy bits may be very bright since most pixel value of the target image 400A may exceed the maximum pixel value of the subframe 400B. The subframe image 400D capturing the high energy bits may be very dim because most of the pixel value of the target image 400A may be below the pixel value range of the subframe 400D. This may work well for traditional displays such as LCD/LED displays since the user eyes do not change dramatically between the subframe images. However, for AR/VR system, it will create temporal artifacts that could negatively impact the quality of the displayed images and user experiences on the AR/VR system. To solve the artifact problem in the subframe images, a temporal dithering method may be used to generate a series of subframe images for representing a target image with more even luminance distribution across all subframe images. The system may use using an error buffer to provide temporal feedback. The temporal dithering method may dither quantization errors temporally to the subsequent subframes through the error buffer. Each subframe may be generated by taking into consideration what has been displayed in previously subframes and may be generated based on a dithering mask having a spatio stacking property.

Figure 5A:
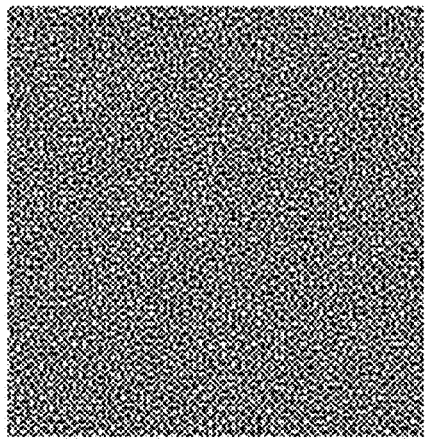
FIG. 5A illustrates an example dithering mask based on dot patterns with blue-noise properties and satisfying spatio stacking constraints.
Figure 5D:
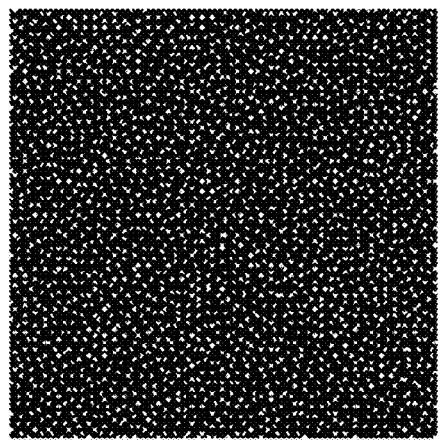
FIGS. 5B-D illustrate example dot patterns for grayscale level 1, 8, and 32 in a grayscale level range of [0, 255].
Figure 5C:
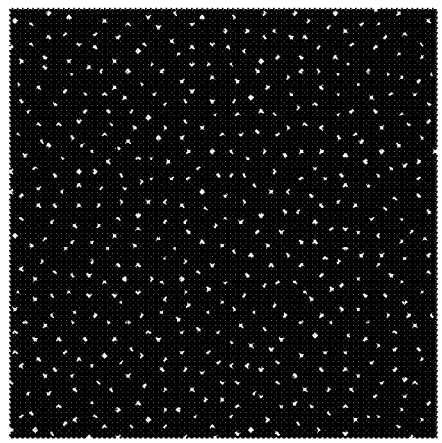
Figure 5B:
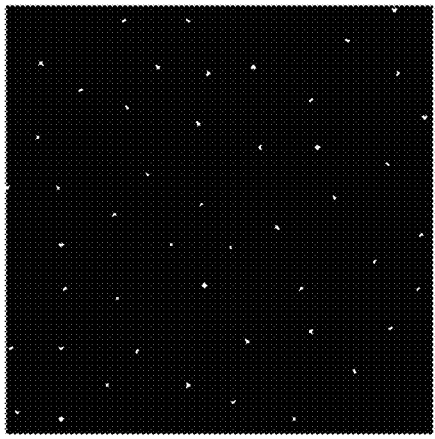

FIG. 5A illustrates an example dithering mask based on dot patterns with blue-noise properties and satisfying spatio stacking constraints. FIGS. 5B-D illustrate example dot patterns for grayscale level 1, 8, and 32 in the grayscale level range of [0, 255]. In particular embodiments, the system may generate spatio dithering masks based on dot patterns with blue-noise properties. The dithering mask may include a number of dot patterns with each dot pattern having a dot density corresponding to a grayscale level within the grayscale level range corresponding to the quantization range. A dot pattern for a higher grayscale level may have a higher dot density than a dot pattern for a lower grayscale level. The dot patterns may be chosen to have blue-noise properties (e.g., with the frequency spectrum being blue-noise weighted). The grayscale level range corresponding to the quantization range may be determined by the bit length of the display. For example, an 8-bit display may have a grayscale level range of [0, 255]. As another example, a 6-bit display may have a grayscale level range of [0, 63]. As another example, a 4-bit display may have a grayscale level range of [0-15]. In particular embodiments, the dot patterns of the dithering mask may have a spatial stacking property according to which a dot pattern of a grayscale level N may include all dot patterns of lower grayscale levels from 1 to N−1. For example, the dots in the dot pattern of grayscale level 1 (as shown in FIG. 5A) may be included in the dot pattern of grayscale level 8 (as shown in FIG. 5B) and in the dot pattern of grayscale level 32 (as shown in FIG. 5C). As another example, the dots in the dot pattern of grayscale level 8 (as shown in FIG. 5B) may be included in the dot pattern of the grayscale level 32 (as shown in FIG. 5C).

In particular embodiments, each dot in the dithering mask may correspond to a threshold value which equals to the lowest grayscale level allowing that dot to be turned on (i.e., the lowest grayscale level whose corresponding dot pattern includes that dot). From the lowest grayscale level to the highest grayscale level, once a dot is turned on (i.e., being included in a dot pattern of a grayscale level), the dot may stay in the turn-on state for all higher grayscale levels (i.e., being included in the dot patterns of all higher grayscale levels). The spatio stacking properties of the dot patterns may allow all dot patterns to be encoded into one dithering mask. In particular embodiments, the dithering mask (e.g., 500A in FIG. 5A) may include all the dot patterns (which are spatially stacked together) corresponding to all grayscale levels of the quantization range which may correspond to the gray level bits of the display (e.g., [0, 255] for 8-bit display, [0, 63] for 6-bit display, [0, 15] for 3-bit display). The dithering mask (e.g., 500A in FIG. 5A) may have a third dimension for storing the threshold values associated with the respective dots. In particular embodiments, the threshold values stored in the dithering mask may be the actual grayscale level values (e.g., [0, 255] for 8-bit display). In particular embodiments, the threshold values stored in the dithering mask may be normalized grayscale level values (e.g., [0, 1] for any bit display). In this case, the threshold values may be determined by the normalized grayscale level range of [0, 1] and the number of grayscale levels (e.g., 255 for 8-bit display). For example, for an 8-bit display, the threshold values could be 0, 1/255, 2/255 . . . 8/255 . . . 32/255 . . . 255/255, etc. As another example, for a 3-bit display, the threshold values could be 0, 1/7, 2/7, . . . 7/7, etc.

In particular embodiments, the system may generate a series of subframes with fewer grayscale levels which could be displayed temporally to make an illusion of a target image with more grayscale levels. The system may use a mask-based spatio-temporal dithering method to generate each subframe of the series of subframes taking into consideration what has been displayed in the previous subframes in the series of subframes. The system may determine target pixel values of current subframe by compensating the quantization errors of all previously subframes of the series of subframes. The quantization errors may be propagated temporally to subsequent subframes through an error buffer. The pixel values of the current subframe may be determined by quantizing compensated target pixel values based on a dithering mask having a spatial stacking property. The spatial stacking property of the generated subframes may be maintained by the using the dithering mask. The temporal stacking property of the generated subframes may be maintained by the quantization error propagation process.

In particular embodiments, the system may display the series of subframes within a predetermined time duration for representing the target image. The pre-determined time duration may correspond to a time window which allows the human visual system to work as temporal integrators. When the subframes are displayed within this predetermined time duration, the subframes may be perceived by the human visual system based on the temporal integrating effect of the human visual system. For example, for the same pixel displayed in different subframes, the effective pixel value of that pixel corresponding to the brightness or grayscale level as perceived by the human visual system may correspond to an aggregation of the actual displayed pixel values of that pixel in all subframes as described in the following equation:

$$p_e = \sum_{1}^{N} p_i \qquad (1)$$

where, $p_e$ is the effective pixel value as perceived by human eye, $p_i$ is the actual displayed pixel value of the pixel of the i-th subframe, N is the total number of subframes. The system may display the series of subframes sequentially in time domain within the pre-determined time duration to represent the target image. A temporal integration of the series of N subframes may provide an effective representation of the target image because of the temporal integration effect of the human visual system.

In particular embodiments, the system may display the series of subframes with time intervals greater than a pre-determined time duration corresponding to the time window allowing the human visual system to work as a temporal integrator. When the subframes are displayed with time intervals greater than this time duration, the subframes may be perceived by human visual systems based on the temporal averaging effect of the human visual system. For example, for a same pixel in different subframes, the effective pixel value of that pixel corresponding to the brightness or gray-scale level as perceived by the human visual systems may correspond to an average of the actual displayed pixel values of that pixel in all subframes as described in the following equation:

$$p_e = \frac{1}{N} \sum_{1}^{N} p_i \qquad (2)$$

where, $p_e$ is the effective pixel value as perceived by human eye, $p_i$ is the actual displayed pixel value of the pixel in the i-th subframe, N is the total number of subframes.

In particular embodiments, the system may determine pixel values of a n-th subframe of a series of N subframes taking into consideration what has been displayed in previously subframes in the series of N subframes. The pixel values of the n-th subframe may compensate the difference between (1) the aggregated target pixel value of subframes 1 to n and (2) the aggregation of the displayed pixel values of all previous subframes 1 to n−1 within the series of N subframes. In particular embodiments, the system may assume that the series of N subframes will be displayed sequentially in time domain within a pre-determined time duration which allows the human visual systems to work as temporal integrators. For an overall target pixel value $I_{xy}$ for a pixel to be displayed in a series of N subframes, the ideal target pixel value for the pixel in each subframe may be $$\frac{1}{N} \cdot I_{xy}.$$

The overall target pixel value $I_{xy}$ may correspond to the overall brightness of the pixel displayed in the series of N subframes as perceived by the human visual system (because of the temporal integration effect). For determining a pixel value for a pixel at a pixel position (x, y) of a current subframe (e.g., the n-th subframe), the system may determine difference between the aggregated target pixel value of subframes 1 to n and the aggregation of the displayed pixel values of all previous subframes 1 to n−1 to determine the compensated target pixel value for the pixel (x, y) of the current subframe. In particular embodiments, the system may determine a compensated target pixel value using the following equation:

$$p_{xy}^n = \max\left\{\min\left[\frac{n}{N} \cdot I_{xy} - F_{xy}^{n-1}\right]\right\} \qquad (3)$$

where, $p_{xy}^n$ is a compensated target pixel value for the pixel (x, y) of the current n-th subframe, $I_{xy}$ is an overall target pixel value for the pixel (x, y) of the series of N subframes, $F_{xy}^{n-1}$ is an aggregation of the actual pixel values displayed in previously subframes of 1 to n−1, max and min operations in combination clip the $n \cdot I_{xy}/N - F_{xy}^{n-1}$ into a range of [0, 1]. In particular embodiments, the aggregation of the actual pixel values displayed in previously subframes may be represented by the following equation:

$$F_{xy}^{n-1} = \sum_{1}^{n-1} p'^{i}_{xy} \qquad (4)$$

where, $p'^{i}_{xy}$ is the actual pixel value (e.g., the quantized pixel value) for the pixel (x, y) of the i-th subframe. In other words, the aggregation of actual pixel values displayed in previous subframes may be an accumulative sum of the actually displayed pixel values. For example, the aggregation of actual pixel value displayed in the subframes of 1 to n may be determined using the following equation:

$$F_{xy}^n = F_{xy}^{n-1} + p'^{n}_{xy} \qquad (5)$$

where, $F_{xy}^n$ is an aggregation of actually pixel values of subframes 1 to n, $F_{xy}^{n-1}$ is an aggregation of actually pixel values of subframes 1 to n−1, $p'^{n}_{xy}$ is a quantized pixel value for the pixel (x, y) that is displayed in the current n-th subframe. In particular embodiments, the quantized pixel value $p'^{n}_{xy}$ to be dithered and displayed for the pixel (x, y) of the n-th subframe may be determined by quantizing the compensated target pixel value $p_{xy}^n$ using the following equation:

$$p'^{n}_{xy} = Q\{p_{xy}^n\} \qquad (6)$$

where, Q is a linear or non-linear quantization operation.

In particular embodiments, the system may determine the compensated target pixel value for the pixel (x, y) of the current n-th subframe based on the difference between an aggregated target pixel value $$\frac{n}{N} \cdot I_{xy}$$

and an aggregated actual pixel value of previous subframes $F_{xy}^{n-1}$. In particular embodiments, for computation efficiency purpose, the system may determine an intermediate compensated target pixel value using the following equation:

$$p''^{n}_{xy} = \max\{\min[n \cdot I_{xy} - N \cdot F_{xy}^{n-1}]\} \qquad (7)$$

where, $p'^{n}_{xy}$ is an intermediate compensated target pixel value, max and min are operations for clipping the $n \cdot I_{xy} -$ $N \cdot F_{xy}''^{n-1}$ into a range of $[0, 1]$. In particular embodiments, the intermediate compensated target pixel value $p''_{xy}{}^n$ may be used for the quantization process to determine the quantized pixel value $p'_{xy}{}^n$ to be displayed for the pixel $(x, y)$ of the current n-th subframe. In particular embodiments, the quantized pixel value $p'_{xy}{}^n$ to be dithered and displayed for the pixel $(x, y)$ of the n-th subframe may be determined by quantizing the intermediate compensated target pixel value $p''_{xy}{}^n$ and divide the quantized value by N using the following equation:

$$p'^n_{xy} = \frac{1}{N} Q\{p'''^n_{xy}\} \tag{8}$$

where, Q is a linear or non-linear quantization operation.

Figure 6A:
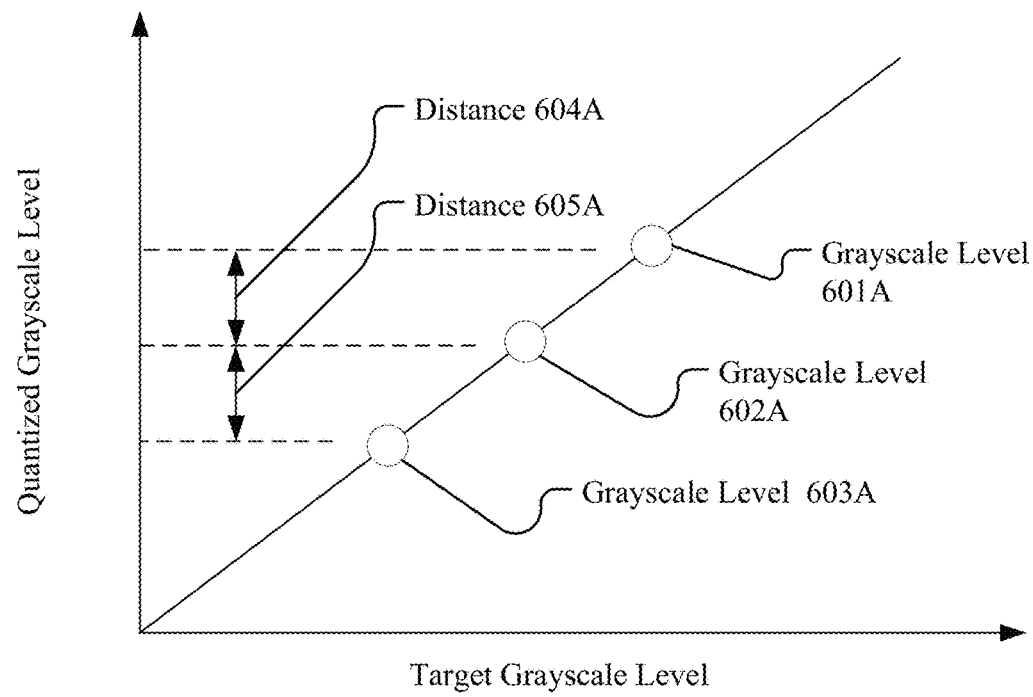
FIG. 6A illustrates an example linear quantization process based on a quantization range including uniformly distributed grayscale levels.

FIG. 6A illustrates an example linear quantization process 600A based on a quantization range including uniformly distributed grayscale levels (e.g., 601A, 602A, 603A). In particular embodiments, the system may use a linear quantization process and a dithering mask for determining the pixel values to be dithered in each subframe of the series of subframes. The linear quantization process 600A may have quantization grayscale levels (e.g., 601A, 602A, 603A) being uniformly distributed in the quantization range. In other words, the distance between neighboring quantization levels (e.g., the distance 604A between the grayscale level 601A and 602A, the distance 605A between the grayscale level 602A and 603A) may equal to each other. For determining a quantized pixel value for a pixel at a pixel position $(x, y)$ of the n-th subframe, the system may access a mask value or threshold value to from a dithering mask having a spatial stacking property. The accessed mask value to may correspond to the pixel position $(x, y)$.

In particular embodiments, the system may determine the quantized pixel value for the pixel $(x, y)$ of the n-th subframe based on the intermediate compensated target pixel value $p''_{xy}{}^n$ or the compensated target pixel value $p_{xy}{}^n$ for that pixel, the quantization level unit corresponding to the least significant bit (LSB), and the mask value $t_{xy}$ corresponding to that pixel position $(x, y)$ accessed from the dithering mask. As an example and not by way of limitation, for a display having k spatial bits, the subframes may have $2^k$ grayscale levels within the quantization range. In this disclosure, the term "spatial bits" may refer to a bit number corresponding to the number of grey levels that a subframe can have using a quantization process within that subframe based on spatial dithering. The quantization level unit $U_{LSB}$ corresponding to the least significant bit (LSB) may be determined by the following equation:

$$U_{LSB} = \frac{1}{2^k - 1} \tag{9}$$

In particular embodiments, the quantized pixel value for the pixel at the position $(x, y)$ may be determined based on the intermediate compensated target pixel value $p''_{xy}{}^n$ using the following equation:

$$p'^n_{xy} = \frac{1}{N} \cdot U_{LSB} \cdot \left\lfloor \frac{p'''^n_{xy}}{U_{LSB}} + t_{xy} \right\rfloor \tag{10}$$

where, $p'_{xy}{}^n$ is the quantized pixel value, $U_{LSB}$ is the quantization level unit corresponding to the LSB, $t_{xy}$ is the threshold value or mask value accessed in the dithering mask corresponding to the pixel position $(x, y)$, $\lfloor \cdot \rfloor$ is the floor operator. In other words, the system may divide the intermediate compensated target pixel $p''_{xy}{}^n$ by the quantization level unit $U_{LSB}$ (e.g., $$\frac{1}{2^k - 1}$$

for k bits) of the quantization range and add the mask value $t_{xy}$ to the result of division. Then, the system may use floor operation to determine the closest grayscale level lower than $$\frac{p'''^n_{xy}}{U_{LSB}} + t_{xy}$$

and multiply the result by the quantization level unit $U_{LSB}$ to normalize the value into a normalized range of $[0, 1]$. After that, the system may divide the normalized result by N to determine the quantized pixel value $p'_{xy}{}^n$.

In particular embodiments, for determining the quantized pixel value for the pixel at the position $(x, y)$, the system may directly quantize the compensated target pixel value $p_{xy}{}^n$ using the following equation:

$$p'''^n_{xy} = U_{LSB} \cdot \left\lfloor \frac{p^n_{xy}}{U_{LSB}} + t_{xy} \right\rfloor \tag{11}$$

where, $p'_{xy}{}^n$ is the quantized pixel value, $U_{LSB}$ is the quantization level unit corresponding to the LSB, $t_{xy}$ is the threshold value or mask value accessed in the dithering mask corresponding to the pixel position $(x, y)$, $\lfloor \cdot \rfloor$ is the floor operator. In other words, the system may divide compensated target pixel value $p_{xy}{}^n$ by the quantization level unit $U_{LSB}$ (e.g., $$U_{LSB} = \frac{1}{2^k - 1}$$

or k bits) of the quantization range and add the mask value $t_{xy}$ to the result of division. Then, the system may use floor operation to determine the closest grayscale level less than $$\frac{p^n_{xy}}{U_{LSB}} + t_{xy}$$

and multiply the result by the quantization level unit $U_{LSB}$ to normalize the value into a normalized range of $[0, 1]$ to determine the quantized pixel value $p'_{xy}{}^n$.

In particular embodiments, the quantized pixel value for a pixel $(x, y)$ may be determined based on an associated mask value $t_{xy}$. In particular embodiments, the mask values in the dithering mask may be within a normalized range of $[0, 1]$. The floor operation used in the quantization process may find the closet lower grayscale level. By adding the mask value $t_{xy}$ to $$\frac{p_{xy}^n}{U_{LSB}}$$

before performing the floor operation, the system may compare the distance between the $$\frac{p_{xy}^n}{U_{LSB}}$$

and the closest grayscale level higher than $$\frac{p_{xy}^n}{U_{LSB}}$$

to the mask value $t_{xy}$. When the distance between the $$\frac{p_{xy}^n}{U_{LSB}}$$

and the closest grayscale level higher than $$\frac{p_{xy}^n}{U_{LSB}}$$

is smaller than the mask value $t_{xy}$, the addition of $$\frac{p_{xy}^n}{U_{LSB}}$$

and $t_{xy}$ may be greater than the closest grayscale level higher than $$\frac{p_{xy}^n}{U_{LSB}}.$$

The system may select the closest grayscale level higher than $$\frac{p_{xy}^n}{U_{LSB}}$$

as the quantized pixel value using the floor operation. When the distance between the $$\frac{p_{xy}^n}{U_{LSB}}$$

and the closest grayscale level higher than $$\frac{p_{xy}^n}{U_{LSB}}$$

is greater than the mask value $t_{xy}$, the addition of $$\frac{p_{xy}^n}{U_{LSB}}$$

and $t_{xy}$ may be smaller than the closest grayscale level higher than $$\frac{p_{xy}^n}{U_{LSB}}.$$

The system may select the closest grayscale level lower than $$\frac{p_{xy}^n}{U_{LSB}}$$

as the quantized pixel value using the floor operation. The system may repeat the above processes to determine the pixel values of each subframe and generate the series of N subframes. Because the dithering mask has a blue-noise pattern and satisfies a spatial stacking property, the series of subframes generated in this way may satisfiy the spatial stacking property as determined by the dithering mask.

Figure 6B:
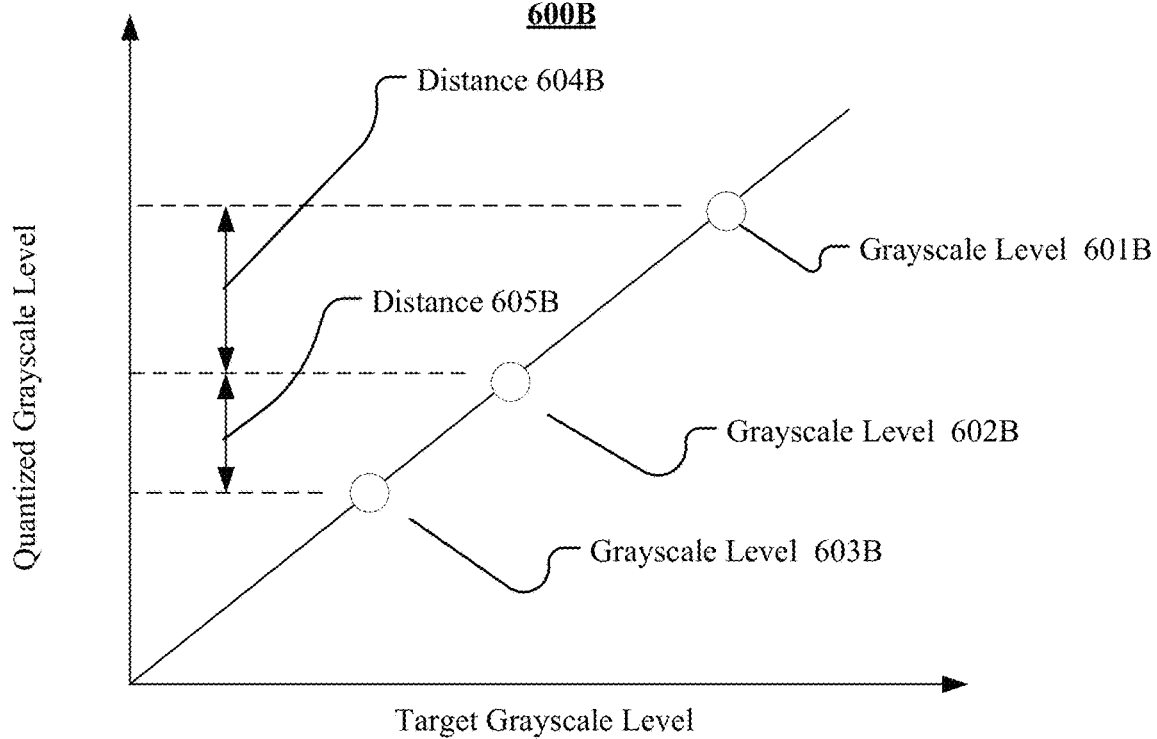
FIG. 6B illustrates an example non-linear quantization process based on a quantization range including non-uniformly distributed grayscale levels.

FIG. 6B illustrates an example non-linear quantization process 600B based on a quantization range including non-uniformly distributed grayscale levels (e.g., 601B, 602B, 603B). In particular embodiments, the system may use a non-linear quantization process and a dithering mask for determining the pixel values to be dithered in each subframe of the series of subframes. The non-linear quantization process 600B may have quantization grayscale levels (e.g., 601B, 602B, 603B) being distributed in the quantization range non-uniformly. In other words, the distances between neighboring quantization levels (e.g., the distance 604B between the grayscale level 601B and 602B, the distance 605B between the grayscale level 602B and 603B) may be different from each other. For determining a quantized pixel value for a pixel at a pixel position (x, y) of the current n-th subframe, the system may access a mask value or threshold value $t_{xy}$ from a dithering mask having a spatial stacking property. The accessed mask value $t_{xy}$ may correspond to the pixel position (x, y).

In particular embodiments, the system may determine the quantized pixel value for the pixel (x, y) of the n-th subframe based on the intermediate compensated target pixel value $p''^n_{xy}$ for that pixel and the mask value $t_{xy}$ corresponding to that pixel position (x, y) accessed from the dithering mask. As an example and not by way of limitation, for a display having k spatial bits, the system may have $2^k$ arbitrary grayscale levels within the quantization range. The arbitrary grayscale levels may increase monotonically within the quantization range and may be distributed within the quantization range non-uniformly. For the quantization process, the system may find the grayscale level $g_j$ which is the closest grayscale level lower than the intermediate compensated target pixel value $p''^n_{xy}$ and the grayscale level $g_{j+1}$ which is the closest grayscale level higher than the intermediate compensated target pixel value $p''^n_{y}$. Then, the system may determine a remainder r using the following equation:

$$r = \frac{p_{xy}^{\prime n} - 9j}{g_{j+1} - g_j} \quad (12)$$

The system may compare the remainder r to the mask value $t_{xy}$ corresponding this pixel to determine the quantized pixel value using the following equation:

$$p_{xy}^{\prime n} = \frac{1}{N}(g_j + f(r > t_{xy})) \quad (13)$$

where, $p_{xy}^{\prime n}$ is the quantized pixel value, N is the number of subframes, $f$ is a function which equals to 1 when the remainder is greater than $t_{xy}$, and equals to 0 when the remainder is not greater than $t_{xy}$. By using the mask value accessed from the dithering mask for quantizing the dithering values, the system may generate the series of N subframes preserving the spatial stacking property as determined by the dithering mask.

In particular embodiments, the system may determine the quantized pixel value for the pixel (x, y) of the n-th subframe based on the compensated target pixel value $p_{xy}^n$, for that pixel and the mask value $t_{xy}$ corresponding to that pixel position (x, y) accessed from the dithering mask. As an example and not by way of limitation, for a display having k spatial bits, the system may have $2^k$ arbitrary grayscale levels within the quantization range. The arbitrary grayscale levels may increase monotonically within the quantization range and may be distributed within the quantization range non-uniformly. For the quantization process, the system may find the grayscale level g which is the closest grayscale level lower than the intermediate compensated target pixel value $p_{xy}^n$ and the grayscale level $g_{j+1}$ which is the closest grayscale level higher than the intermediate compensated target pixel value $p_{xy}^n$. In particular embodiments, to improve search efficiency, the system may identify the g and $g_{j+1}$ by performing a binary search within the quantization range having the non-uniform grayscale levels. Then, the system may determine a remainder r using the following equation:

$$r = \frac{p_{xy}^n - g_j}{g_{j+1} - g_j} \quad (14)$$

The system may compare the remainder r to the mask value $t_{xy}$ corresponding this pixel to determine the quantized pixel value using the following equation:

$$p_{xy}^{\prime n} = (g_j + f(r > t_{xy})) \quad (15)$$

where, $p_{xy}^{\prime n}$ is the quantized pixel value, N is the number of subframes, $f$ is a function which equals to 1 when the remainder is greater than $t_{xy}$, and equals to 0 when the remainder is less than or equal to $t_{xy}$. By using the mask value accessed from the dithering mask for quantizing the dithering values, the system may generate the series of N subframes preserving the spatial stacking property as determined by the dithering mask.

As an example and not by way of limitation, the system may generate N=4 subframes with one-bit color depth for representing a target pixel image with more color depth bits. The 4 subframes may be generated using a uniform one-bit quantizer. Given an overall target pixel value $I_{xy}$=0.33 and an associated mask value $t_{xy}$=0.5928 for a pixel at a position (x, y), the system may use the processes as described in this disclosure to determine, for each of the 4 subframes, the intermediate compensated target pixel value, the quantized pixel value, and the aggregation of displayed pixel value as shown in Table 1. As a result, the aggregation of the actual pixel values may be 0.25 which is an effective approximation to the overall target pixel value 0.33.

TABLE 1

|  | n = 1 | n = 2 | n = 3 | n = 4 |
|---|---|---|---|---|
| $t_{xy}$ |  | 0.5928 |  |  |
| $p_{xy}$ | 0.33 | 0.67 | 0 | ⅓ |
| $p'_{xy}$ | 0 | 1 | 0 | 0 |
| $F_{xy}^n$ | 0 | 0.25 | 0.25 | 0.25 |

As an example and not by way of limitation, the system may generate N=4 subframes with one-bit color depth for representing a target pixel image with more color depth bits. The 4 subframes may be generated using a uniform one-bit quantizer. Given a target pixel value $I_{xy}$=0.7 and an associated mask value $t_{xy}$=0.5928 for a pixel at a position (x, y), the system may use the processes as described in this disclosure to determine, for each of the 4 subframes, the intermediate compensated target pixel value, the quantized pixel value, and the aggregation of displayed pixel value as shown in Table 2. As a result, the aggregation of the actual pixel values may be 0.75 which is an effective approximation to the overall target pixel value 0.7.

TABLE 2

|  | n = 1 | n = 2 | n = 3 | n = 4 |
|---|---|---|---|---|
| $t_{xy}$ |  | 0.5928 |  |  |
| $p_{xy}$ | 0.7 | 0.4 | 1 | 0.8 |
| $p'_{xy}$ | 1 | 0 | 1 | 1 |
| $F_{xy}^n$ | 0.25 | 0.25 | 0.5 | 0.75 |

Figure 7:
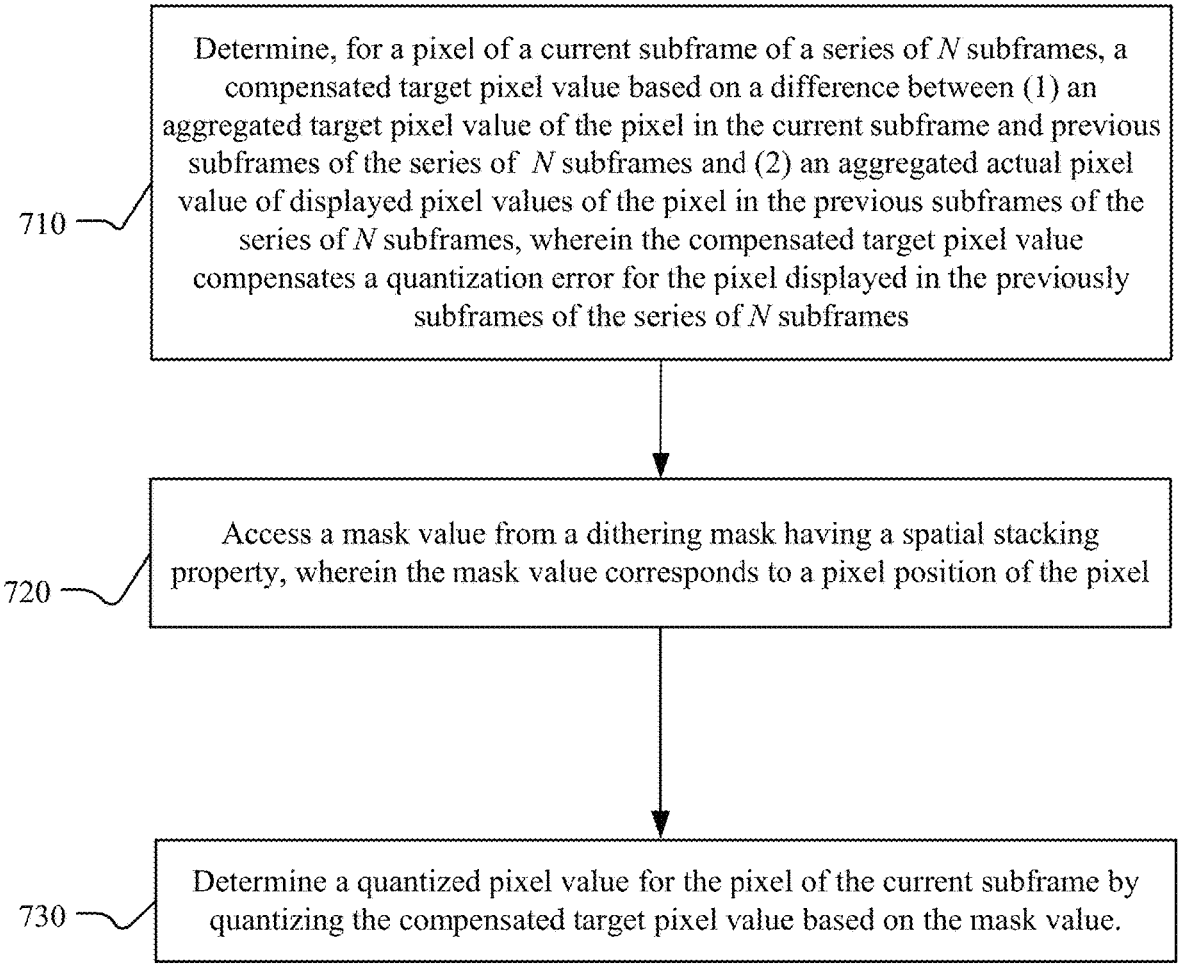
FIG. 7 illustrates an example method for determining pixel values of a current subframe based on the pixel values displayed in previously subframes.

FIG. 7 illustrates an example method 700 for determining pixel values of a current subframe based on the pixel values displayed in previously subframes. The method may begin at step 710, where a computing system may determine, for a pixel of a current subframe of a series of N subframes, a compensated target pixel value based on a difference between (1) an aggregated target pixel value of the pixel in the current subframe and previous subframes of the series of N subframes and (2) an aggregated actual pixel value of displayed pixel values of the pixel in the previous subframes of the series of N subframes. The compensated target pixel value may compensate a quantization error for the pixel displayed in the previously subframes of the series ofN subframes. At step 720, the system may access a mask value, corresponding to a pixel position of the pixel, from a dithering mask having a spatial stacking property. At step 730, the system may determine a quantized pixel value for the pixel of the current subframe by quantizing the compensated target pixel value based on the mask value.

In particular embodiments, the aggregated target pixel value may be determined based on a target pixel value for the pixel and a current subframe number n of the series of N subframes. In particular embodiments, the aggregated actual pixel value may be a sum of the displayed pixel values of the pixel in the previous subframes of the current subframe of the series of N subframes. In particular embodiments, the quantized pixel value may be determined based on a linear quantization on a quantization range comprising uniformly distributed quantization levels within the quantization range. The quantized pixel value may be determined based on the compensated target pixel value, a quantization level unit corresponding a least significant bit (LSB) of the quantization range, and the mask value accessed from the dithering mask. In particular embodiments, the quantized pixel value may correspond to a closest quantization level lower than the compensated target pixel value adjusted by the mask value and may be determined based on a floor operation.

In particular embodiments, the quantized pixel value may be determined based on a non-linear quantization on a quantization range comprising non-uniformly distributed quantization levels within the quantization range. In particular embodiments, the quantized pixel value may be determined by: determining a first closest quantization level lower than the compensated target pixel value, determining a second closest quantization level greater than the compensated target pixel value, determining a remainder of the compensated pixel value over the first closest quantization level, comparing the remainder to the mask value accessed from the dithering mask. When the remainder is less than the mask value, the system may determine the quantized pixel value based on the first closest quantization level. When the remainder is greater than the mask value, the system may determine the quantized pixel value based on the second closest quantization level.

In particular embodiments, the system may determine an intermediate compensated target pixel value based on the difference between (1) the aggregated target pixel value of the current subframe and the previously subframes and (2) the aggregated actual pixel value of the previous subframes. The intermediate compensated target pixel may be N times of the compensated target pixel value. The system may clip the intermediate compensated target pixel value into a range of [0, 1]. The compensated target pixel value may be determined based on a quantization result of the intermediate compensated target pixel value. In particular embodiments, the system may generate the series of N subframes for representing a target frame and display the series of N subframes sequentially in a time domain within a predetermined time duration which allows human visual systems to work as temporal integrators for perceiving the series of N subframes. In particular embodiments, the dithering mask may include a number of stacked dot patterns each including a number of dots. Each dot of the dithering mask is associated with a threshold value corresponding to a lowest threshold value which has a corresponding dot pattern that includes that dot. Each of the stacked dot patterns may satisfy a spatio stacking constraint by including all dot patterns corresponding to lower grayscale levels.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for determining pixel values of a current subframe based on the pixel values displayed in previously subframes including the particular steps of the method of FIG. 7, this disclosure contemplates any suitable method for determining pixel values of a current subframe based on the pixel values displayed in previously subframes including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
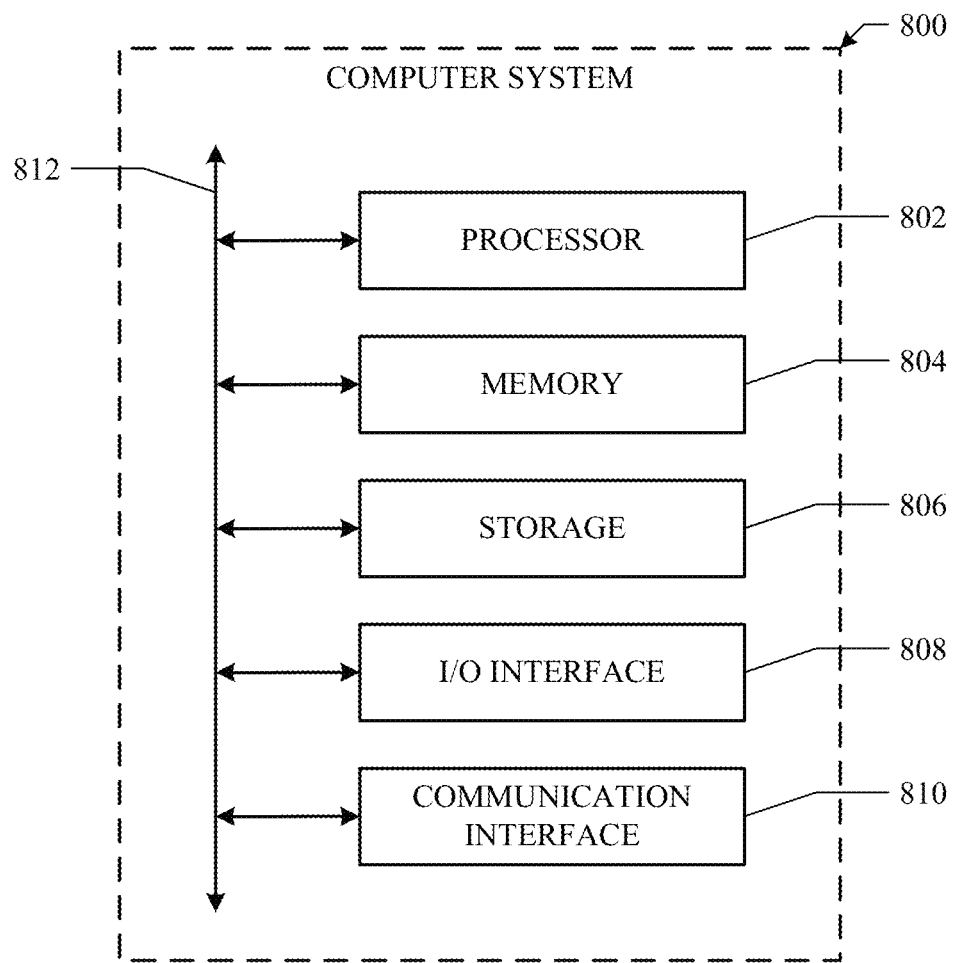
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (IO) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more/O devices. Computer system 800 may include one or more of these/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
generating a series of N subframes for representing a target frame, wherein a current subframe of the series of N subframes is generated by:
   determining, for a pixel of the current subframe of the series of N subframes, a compensated target pixel value based on a difference between (1) an aggregated target pixel value of target pixel values of the pixel in the current subframe and previous subframes of the series of N subframes and (2) an aggregated actual pixel value of displayed pixel values of the pixel in the previous subframes of the series of N subframes, wherein the compensated target pixel value compensates a quantization error for the pixel displayed in the previously subframes of the series of N subframes;
   accessing a mask value from a dithering mask having a spatial stacking property, wherein the mask value corresponds to a pixel position of the pixel; and
   determining a quantized pixel value for the pixel of the current subframe by quantizing the compensated target pixel value based on the mask value; and
displaying the series of N subframes sequentially in a time domain within a pre-determined time duration, wherein the pre-determined time duration allows human visual systems to work as temporal integrators for perceiving the series of N subframes.

2. The method of claim 1, wherein the aggregated target pixel value is determined based on a target pixel value for the pixel and a current subframe number n of the series of N subframes.

3. The method of claim 1, wherein the aggregated actual pixel value is a sum of the displayed pixel values of the pixel in the previous subframes with respect to the current subframe in the series of N subframes.

4. The method of claim 1, wherein the quantized pixel value is determined based on a linear quantization on a quantization range comprising uniformly distributed quantization levels within the quantization range.

5. The method of claim 4, wherein the quantized pixel value is determined based on the compensated target pixel value, a quantization level unit corresponding a least significant bit (LSB) of the quantization range, and the mask value accessed from the dithering mask.

6. The method of claim 5, wherein the quantized pixel value corresponds to a closest quantization level lower than the compensated target pixel value adjusted by the mask value, and wherein the quantized pixel value is determined based on a floor operation.

7. The method of claim 1, wherein the quantized pixel value is determined based on a non-linear quantization on a quantization range comprising non-uniformly distributed quantization levels within the quantization range.

8. The method of claim 7, wherein the quantized pixel value is determined by:
   determining a first closest quantization level lower than the compensated target pixel value;
   determining a second closest quantization level greater than the compensated target pixel value;
   determining a remainder of the compensated pixel value over the first closest quantization level;

comparing the remainder to the mask value accessed from the dithering mask; and
when the remainder is less than the mask value, determining the quantized pixel value based on the first closest quantization level; and
when the remainder is greater than the mask value, determining the quantized pixel value based on the second closest quantization level.

9. The method of claim 1, further comprising:
determining an intermediate compensated target pixel value based on the difference between (1) the aggregated target pixel value of the target pixels of the pixel of the current subframe and the previously subframes of the series of N subframes, and (2) the aggregated actual pixel value of the displayed pixel values of the pixel in the previous subframes of the series of N subframes, wherein the intermediate compensated target pixel value corresponds to N times of the compensated target pixel value; and
clipping the intermediate compensated target pixel value into a range of [0, 1].

10. The method of claim 9, wherein the compensated target pixel value is determined based on a quantization result of the intermediate compensated target pixel.

11. The method of claim 1, wherein the dithering mask comprises a plurality of stacked dot patterns each comprising a plurality of dots, wherein each dot of the dithering mask is associated with a threshold value, and wherein the threshold value corresponds to a lowest threshold value which has a corresponding dot pattern comprising that dot.

12. The method of claim 11, wherein each of the plurality of stacked dot patterns corresponds to a particular grayscale level and satisfies a spatio stacking constraint by comprising all dot patterns corresponding to lower grayscale levels than that particular grayscale level.

13. One or more computer-readable non-transitory storage media embodying software that is operable when executed to:
generate a series of N subframes for representing a target frame, wherein the software is operable when executed to generate a current subframe of the series of N subframes, and wherein the software is operable when executed to:
determine, for a pixel of a current subframe of a series of N subframes, a compensated target pixel value based on a difference between (1) an aggregated target pixel value of target pixel values of the pixel in the current subframe and previous subframes of the series of N subframes and (2) an aggregated actual pixel value of displayed pixel values of the pixel in the previous subframes of the series of N subframes, wherein the compensated target pixel value compensates a quantization error for the pixel displayed in the previously subframes of the series of N subframes;
access a mask value from a dithering mask having a spatial stacking property, wherein the mask value corresponds to a pixel position of the pixel; and
determine a quantized pixel value for the pixel of the current subframe by quantizing the compensated target pixel value based on the mask value; and display the series of N subframes sequentially in a time domain within a pre-determined time duration, wherein the pre-determined time duration allows human visual systems to work as temporal integrators for perceiving the series of N subframes.

14. The media of claim 13, wherein the aggregated target pixel value is determined based on a target pixel value for the pixel and a current subframe number n of the series of N subframes.

15. The media of claim 13, wherein the aggregated actual pixel value is a sum of the displayed pixel values of the pixel in the previous subframes of the current subframe of the series of N subframes.

16. The media of claim 13, wherein the quantized pixel value is determined based on a linear quantization on a quantization range comprising uniformly distributed quantization levels within the quantization range.

17. A system comprising:
one or more non-transitory computer-readable storage media embodying instructions; and
one or more processors coupled to the storage media and operable to execute the instructions to:
generate a series of N subframes for representing a target frame, wherein the system is configured to generate a current subframe of the series of N subframes, and wherein the system is configured to:
determine, for a pixel of a current subframe of a series of N subframes, a compensated target pixel value based on a difference between (1) an aggregated target pixel value of target pixel values of the pixel in the current subframe and previous subframes of the series of N subframes and (2) an aggregated actual pixel value of displayed pixel values of the pixel in the previous subframes of the series of N subframes, wherein the compensated target pixel value compensates a quantization error for the pixel displayed in the previously subframes of the series of N subframes;
access a mask value from a dithering mask having a spatial stacking property, wherein the mask value corresponds to a pixel position of the pixel; and
determine a quantized pixel value for the pixel of the current subframe by quantizing the compensated target pixel value based on the mask value; and
display the series of N subframes sequentially in a time domain within a pre-determined time duration, wherein the pre-determined time duration allows human visual systems to work as temporal integrators for perceiving the series of N subframes.

18. The system of claim 17 wherein the aggregated target pixel value is determined based on a target pixel value for the pixel and a current subframe number n of the series of N subframes.

19. The system of claim 17, wherein the aggregated actual pixel value is a sum of the displayed pixel values of the pixel in the previous subframes of the current subframe of the series of N subframes.

20. The system of claim 17, wherein the quantized pixel value is determined based on a linear quantization on a quantization range comprising uniformly distributed quantization levels within the quantization range.

* * * * *